(12) United States Patent
Batteram et al.

(10) Patent No.: US 9,526,012 B2
(45) Date of Patent: Dec. 20, 2016

(54) EFFICIENT EVALUATION OF HOTSPOTS FOR METROCELL DEPLOYMENT

(71) Applicants: Alcatel-Lucent USA Inc., Murray Hill, NJ (US); Alcatel Lucent, Boulogne-Billancourt (FR)

(72) Inventors: Harm Jan Batteram, Hoofddorp (NL); Lev B. Sofman, Plano, TX (US); Frank Louwdyk, Rhodes (AU)

(73) Assignee: Alcatel Lucent, Boulogne-Billancourt (FR)

( * ) Notice: Subject to any disclaimer, the term of this patent is extended or adjusted under 35 U.S.C. 154(b) by 118 days.

(21) Appl. No.: 14/323,498

(22) Filed: Jul. 3, 2014

(65) Prior Publication Data
US 2016/0007210 A1  Jan. 7, 2016

(51) Int. Cl.
*H04W 16/18* (2009.01)
*H04W 28/02* (2009.01)
*H04W 16/32* (2009.01)
*H04L 12/891* (2013.01)

(52) U.S. Cl.
CPC ......... *H04W 16/18* (2013.01); *H04W 28/0226* (2013.01); *H04L 47/41* (2013.01); *H04W 16/32* (2013.01)

(58) Field of Classification Search
CPC .................. H04W 16/18; H04W 28/0226
See application file for complete search history.

(56) References Cited

U.S. PATENT DOCUMENTS

| | | | |
|---|---|---|---|
| 2004/0017783 A1* | 1/2004 | Szentesi ............... | H04Q 3/0016 370/256 |
| 2011/0016153 A1* | 1/2011 | Atta ................... | G06F 17/30445 707/797 |
| 2013/0040648 A1* | 2/2013 | Yang .................... | H04W 16/18 455/446 |
| 2014/0141788 A1* | 5/2014 | Puthenpura ........... | H04W 16/18 455/449 |
| 2014/0365669 A1* | 12/2014 | Shamis ................. | H04W 76/02 709/227 |

* cited by examiner

*Primary Examiner* — Kashif Siddiqui
*Assistant Examiner* — Minjung Kim
(74) *Attorney, Agent, or Firm* — Davidson Sheehan LLP

(57) ABSTRACT

Session data for sessions associated with user equipment in portions of a macrocellular coverage area is accessed and a hierarchical data structure including a plurality of levels is generated. Each entry in a higher level of the plurality of levels encompasses a predetermined number of entries in the next lower level and stores aggregated session data for sessions associated with the encompassed entries. Entries in the hierarchical data structure can be selected to represent a hotspot that overlays the macrocellular coverage area. Session data stored in the selected entries can be aggregated.

18 Claims, 15 Drawing Sheets

```
class Node {
    Aggregate total; // object to hold all aggregated session data for a quadrant
    int x, y;   // center x,y coordinate for the current quadrant
    int level;  // level in the QuadTree
    Node nw, ne, sw, se; // Node children for each quadrant.

Aggregate getTotal(Area area) {
        if (total == null) return null;
        if (level == maxLevel) {
            // This is a leaf node
            if (area.contains(x,y)) return total;
            else return null;
        }
        if (area.outside(x0,y0,x1,y1)) return null;// No intersection
        if (area.contains(x0,y0,x1,y1)) return total; // Node completely within area
        else {
            // This node intersects with the area.
            // recursively proceed with each child quadrant.
            Aggregate total = new Aggregate();
            if (nw != null) total.add(nw.getTotal(area));
            if (ne != null) total.add(ne.getTotal(area));
            if (se != null) total.add(se.getTotal(area));
            if (sw != null) total.add(sw.getTotal(area));
            return total;
        }
    }
}
```

FIG. 14

EFFICIENT EVALUATION OF HOTSPOTS FOR METROCELL DEPLOYMENT

BACKGROUND

Field of the Disclosure

The present disclosure relates generally to wireless communication systems and, more particularly, to the deployment of metrocells at hotspots in a wireless communication system.

Description of the Related Art

Wireless communication systems typically include a network of base stations that provide wireless connectivity to user equipment within corresponding geographic areas that are referred to as macrocells to indicate that the coverage area is relatively large, e.g., they have radii on length scales of 1-2 km. A macrocellular coverage area typically contains many macrocells. For example, a macrocellular coverage area associated with a city center may contain several macrocells to provide wireless connectivity throughout the city center. The user equipment are typically not uniformly distributed throughout the geographic coverage area, but tend to be clustered in hotspots. The communication sessions for user equipment in the hotspots can be offloaded from the macrocells to smaller cells (which may be referred to as metrocells with radii on length scales of 50-300 m) that overlay the macrocellular network. Offloading sessions from a macrocell to a metrocell may reduce congestion in the macrocell, particularly if the metrocell is deployed in a hotspot that has a large traffic density. Radio interference from macrocells may constrain the metrocell's footprint, which may be represented by the maximum effective radius of an approximately circular footprint. The footprint may therefore depend on the location of the metrocell relative to nearby macrocells. Only traffic from sessions within the metrocell footprint will offload from the macrocell to the metrocell.

Traffic hotspots within a macrocellular coverage area can be identified using a brute force method that evaluates the amount of traffic in a two-dimensional array of locations distributed uniformly over the macrocellular coverage area. For example, a potential metrocell may be placed at each location in the two-dimensional array and the number of hotspot sessions available for offloading to the potential metrocell may be counted. The potential metrocell locations may then be ordered based on the number of sessions within their footprints and metrocell locations that have a higher number of sessions may be chosen as the locations for actual metrocell deployments. The computation time required to implement the brute force method scales with the area of the macrocellular coverage area (e.g., the square of the radius of a circular macrocellular coverage area) and with the area of the individual hotspots (e.g., the square of the radius of the hotspots).

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 14 is a fragment of pseudocode that illustrates an algorithm for aggregating data associated with a potential hotspot in a macrocellular coverage area using quadrants in different levels of the hierarchical data structure, according to some embodiments.

DETAILED DESCRIPTION

The computation time needed to identify traffic hotspots of variable footprint size and shape within a macrocellular coverage area can be reduced by storing session data for the plurality of sessions in a hierarchical data structure that has a plurality of layers or levels. Each level is subdivided into a plurality of regions that correspond to a portion of the macrocellular coverage area and aggregate the session data for sessions within the corresponding portion of the macrocellular coverage area. Each region in a higher level of the hierarchical data structure encompasses a predetermined number of regions in the next lower level and aggregates the session data for sessions within the encompassed regions in the next lower level. For example, a macrocellular coverage area may be divided into a plurality of quadrants that have a predetermined area. The hierarchical data structure may then be implemented as a tree so that quadrants in higher levels of the tree encompass four quadrants from the next lower level and aggregate session data for sessions within the encompassed quadrants. Regions associated with a macrocellular coverage area that does not include any sessions may not be included in the hierarchical data structure. In some embodiments, the hierarchical data structure may be used to store session data for a plurality of sessions in a three-dimensional macrocellular coverage area or volume, such as an office building in an urban environment. For example, the macrocellular coverage area may be divided into a plurality of cubes that have a predetermined volume. Cubes in higher levels of the tree may encompass and aggregate session data from eight or more cubes from the next lower level.

Potential hotspots may be represented as combinations of regions selected from the plurality of levels of the hierarchical data structure. For example, a circular hotspot may be represented by square quadrants from different levels that aggregate session data for different sized portions of the macrocellular coverage area. Aggregated session data from the square quadrants that represent the circular hotspot can then be used to evaluate the potential hotspot for subsequent deployment of a metrocell. The number of quadrants required to represent a hotspot increases approximately linearly with the length scale of the hotspot and, consequently, the computation time required to evaluate a hotspot may be significantly less than the computation time needed to evaluate the potential hotspot using the brute force method. Furthermore, the difference between the two computation times increases as the length scale of the hotspot increases. In some embodiments, three-dimensional hotspots may be represented by combinations of three-dimensional regions that are selected from different levels of the hierarchical data structure.

Figure 1:
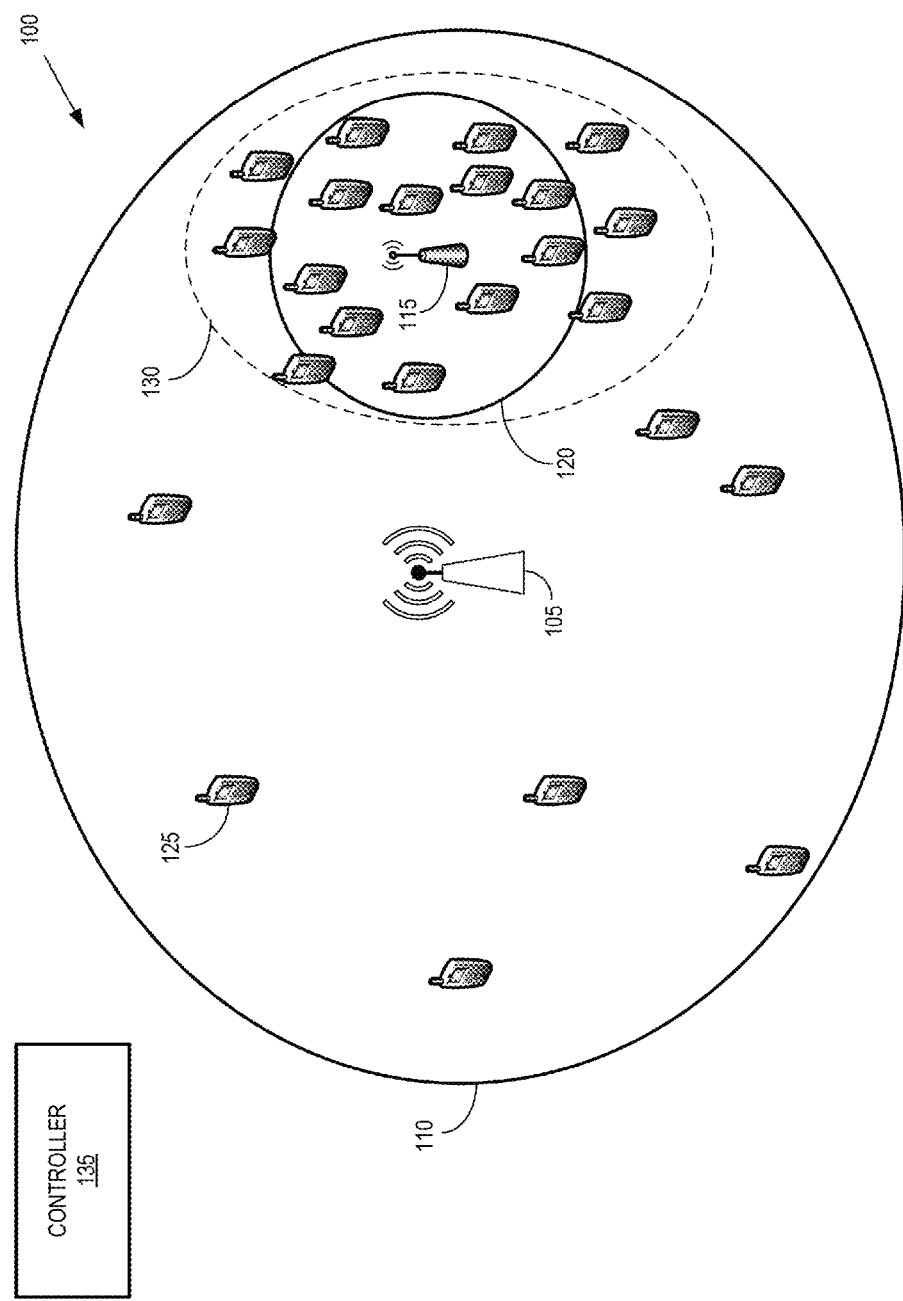
FIG. 1 is a diagram of a wireless communication system according to some embodiments.

FIG. 1 is a diagram of a wireless communication system 100 according to some embodiments. The wireless communication system 100 includes a base station 105 that provides wireless connectivity within a geographic area or macrocell 110. As used herein, the term "base station" refers to any device that provides macrocellular coverage within the wireless communication system 100 and may therefore also refer to devices such as access networks, access serving networks, eNodeBs, base station routers, and the like. In the interest of clarity a single base station 105 is shown in FIG. 1 but some embodiments of the wireless communication system 100 may include a plurality of base stations 105 to provide wireless connectivity over a macrocellular coverage area that includes the macrocell 110 and other cells served by other base stations. Wireless connectivity may be provided according to standards such as the agreed-upon industry standards defined by the Third Generation Partnership Project (3GPP).

A metrocell 115 may be deployed in the wireless communication system 100 to provide wireless connectivity within a footprint 120 that overlays (partially or fully) the macrocell 110. As used herein, the term "metrocell" refers to any device that provides cellular coverage in a geographic region that overlays (partially or fully) a macrocellular coverage area. The term "metrocell" may therefore refer to devices such as home base station routers, femtocells, microcells, picocells, small cell, and the like. The metrocell 115 may offload communication sessions from the macrocell 110. In the interest of clarity, a single metrocell 115 shown in FIG. 1, but some embodiments of the wireless communication system 100 may include additional metrocells 115 to provide connectivity to other regions in the macrocellular coverage area of the wireless communication system 100.

User equipment 125 (only one indicated by a reference numeral in the interest of clarity) may be distributed throughout the macrocellular coverage area of the wireless communication system 100. The distribution of user equipment 125 may vary throughout the macrocellular coverage area so that some portions of the macrocellular coverage area are sparsely populated by user equipment 125 and some portions of the macrocellular coverage area are densely populated with user equipment 125. For example, the wireless communication system 100 may include a hotspot 130 that may be defined based on the relatively large density of user equipment 125 within the hotspot 130. Hotspots may be defined based on the number of users in the hotspot 130 or other criteria including a number of sessions, a number of downlink bytes, a number of uplink bytes, a number of unique user equipment 125, a number of concurrent users or sessions within a time interval, a measure of signal strength associated with the sessions, and the like.

The performance of the wireless communication system 100 may be enhanced by deploying the metrocell 115 so that its footprint 120 overlays (fully or partially) the hotspot 130. Some or all of the user equipment 125 within the hotspot 130 may then be offloaded from the base station 105 to the metrocell 115. The degree of performance enhancement provided by deploying the metrocell 115 depends on accurately positioning the footprint 120 of the metrocell 115 over the hotspot 130. As discussed herein, a conventional brute force method may be used to select a location for deployment of the metrocell 115. However, the conventional brute force method is time-consuming, and the computation time required to implement the brute force method increases with increasing area of the hotspot 130 and, in the illustrated embodiment, increases with the square of the radius of the hotspot 130.

Some embodiments of the wireless communication system 100 implement a controller 135 that can efficiently evaluate potential hotspots and select one or more of the potential hotspots (such as the hotspot 130) as the location for deployment of one or more metrocells 115. Embodiments of the controller 135 may be implemented using one or more processing units, memory elements, input/output devices, and the like. The controller 135 can access session data for sessions associated with user equipment 125 in portions of the macrocellular coverage area and generate a hierarchical data structure that includes a predetermined number of levels. Entries in the levels are configured so that each entry in a higher level encompasses a predetermined number of entries in the next lower level. Each entry may store aggregated session data for sessions associated with the encompassed entries, as discussed herein. Some embodiments of the controller 135 may also select entries in the hierarchical data structure to represent the hotspot 130 and aggregate session data stored in the selected entries to represent the session data associated with the hotspot 130. Some embodiments of the controller 135 may also evaluate multiple potential hotspot locations based on their aggregated session data for potential deployment of a metrocell 115. The area or radius of the potential hotspots may therefore be selected to correspond to the footprint 120 of the metrocell 115.

Figure 2:
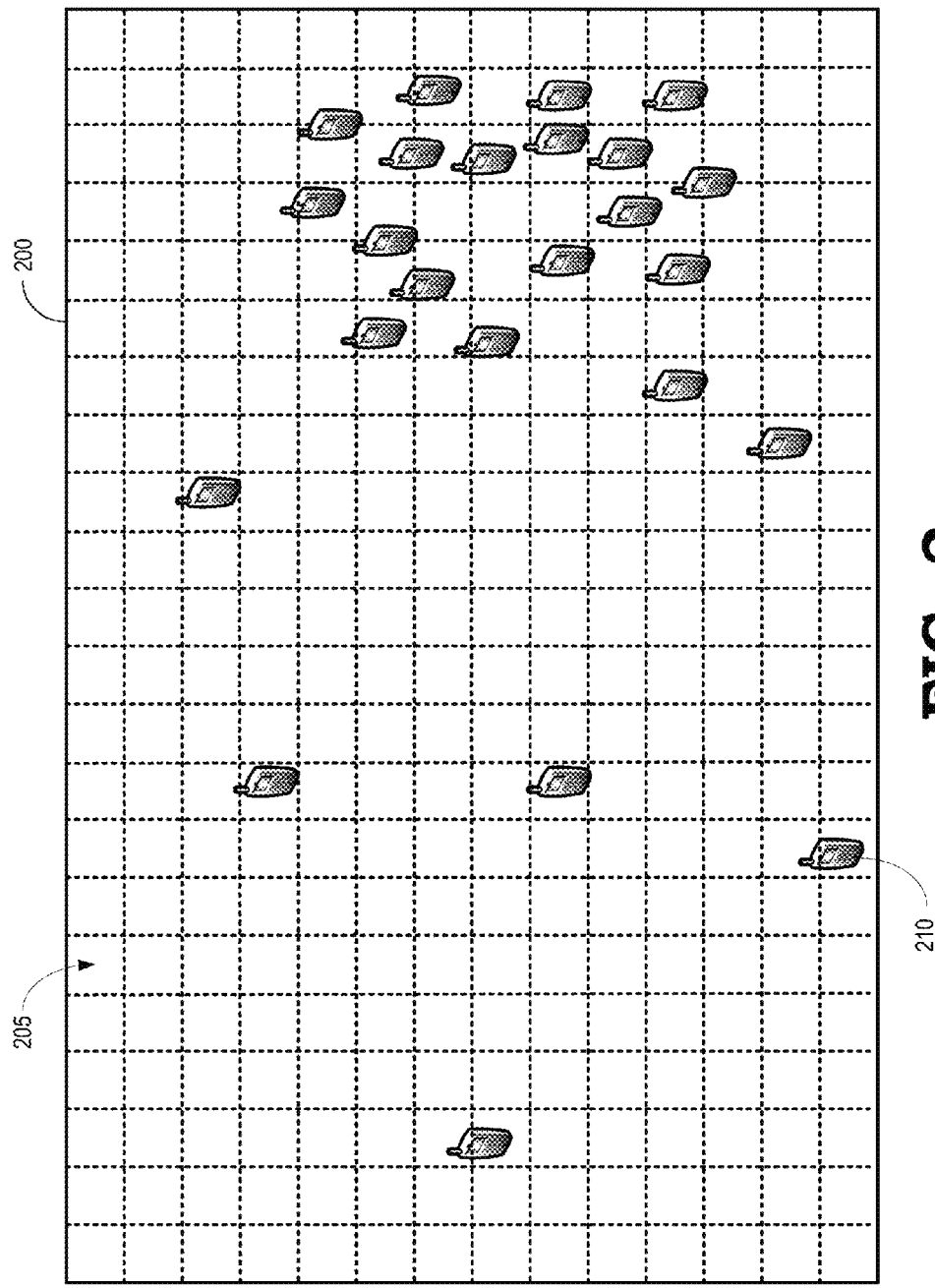
FIG. 2 is a diagram of a partition of a macrocellular coverage area into a plurality of regions according to some embodiments.

FIG. 2 is a diagram of a partition 200 of a macrocellular coverage area into a plurality of regions 205 according to some embodiments. In the interest of clarity, only a single region 205 is indicated by a reference numeral. A distribution of user equipment 210 (only one user equipment indicated by a reference numeral in the interest of clarity) is also shown in FIG. 2. The distribution of user equipment 210 corresponds to the distribution of user equipment 125 shown in FIG. 1 and exhibits a higher density of user equipment 125 in some portions of the macrocellular coverage area and a sparser density of user equipment 125 in other portions of the macrocellular coverage area.

Session data can be collected for each of the user equipment 210 and associated with the region 205 that includes the user equipment 210. Some embodiments of the user equipment 210 may maintain one or more sessions with the wireless communication system and the session data may be collected on a per-user basis or a per-session basis. Session data for the regions 205 may include the number or density of user equipment in the region 205, a number of sessions in the region 205, a number of downlink bytes conveyed to user equipment 210 in the region 205, a number of uplink bytes transmitted by user equipment 210 in the region 205, a number of unique user equipment 210 in the region 205, a number of concurrent users or sessions within a time interval, a measure of signal strength associated with the sessions, and the like. Session data may be measured or acquired by entities in the wireless communication system and stored in records associated with the user equipment 210, e.g., as per call measurement data (PCMD) acquired by measurements performed by devices such as the base station 105 or the metrocell 115 shown in FIG. 1. The session data may then be aggregated into a hierarchical data structure that includes entries at a plurality of levels such that each entry in a higher level encompasses a predetermined number of entries in the next lower level and stores aggregated session data for sessions associated with the encompassed entries.

Figure 3:
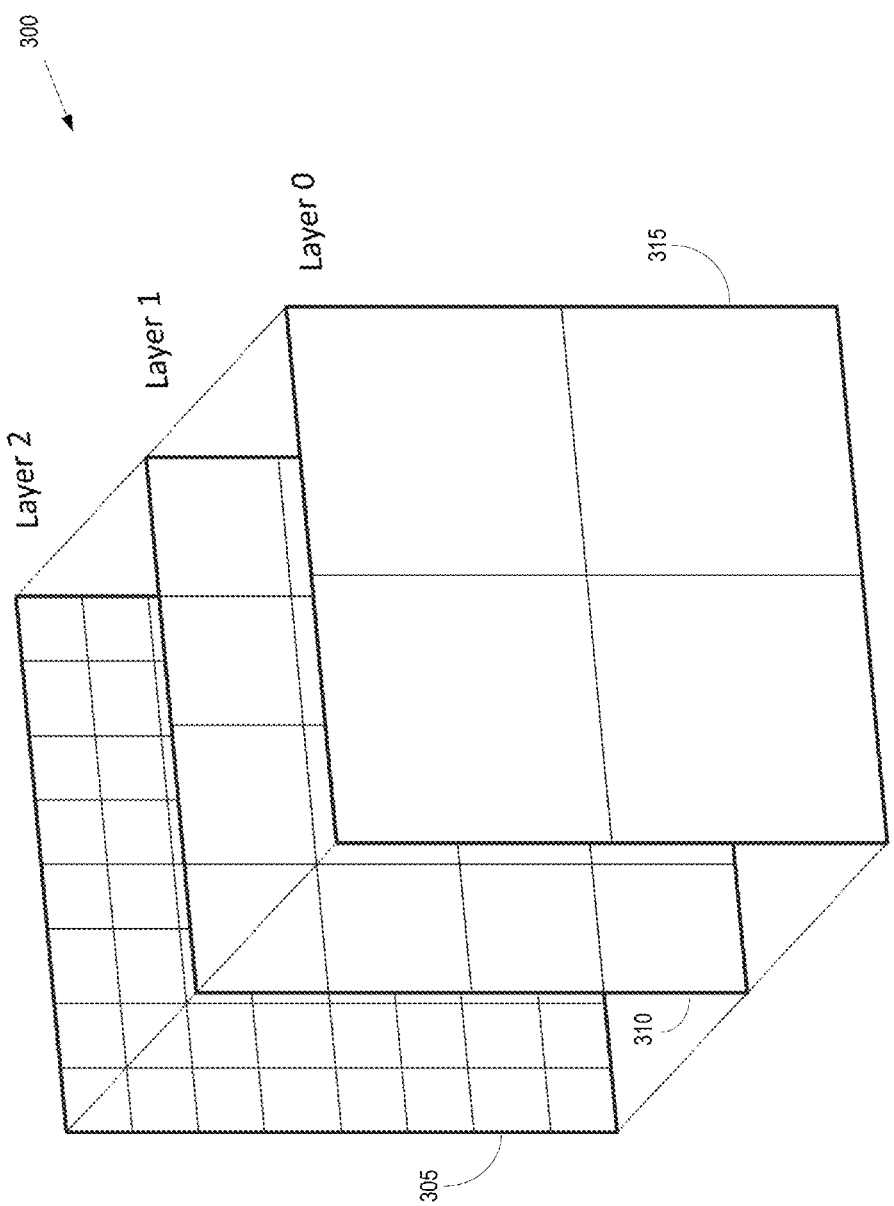
FIG. 3 is a diagram of one example of a set of layers that can be used to create a hierarchical data structure according to some embodiments.

FIG. 3 is a diagram of one example of a set 300 of layers that can be used to create a hierarchical data structure according to some embodiments. The set 300 includes three layers (Layer 0, Layer 1, and Layer 2) that are ordered from the highest layer (Layer 0) to the lowest layer (Layer 2). The lowest layer (Layer 2) divides the Cartesian plane into the largest number of quadrants 305, which have the smallest length dimensions and encompass the smallest areas. Layer 1 divides the Cartesian plane into a smaller number of quadrants 310, which have larger length dimensions and encompass more area than the regions 305. In the illustrated embodiment, each of the quadrants 310 encompasses four regions 305. The highest layer (Layer 0) divides the Cartesian plane into the smallest number of quadrants 315, which have the longest length dimensions and encompass the largest areas. In the illustrated embodiment, each of the quadrants 315 encompasses four quadrants 310. Thus, the term "higher" is used to refer to layers that are subdivided into quadrants that have relatively long length dimensions and encompass relatively large areas compared to the quadrants of "lower" layers. For example, when each quadrant 315 encompasses four quadrants 310, the length scale associated with the higher level quadrants 315 is larger than the length scale associated with the lower level quadrants 310 by an integer factor of four (4). In other embodiments, higher level quadrants may encompass larger numbers of lower level quadrants, e.g., the higher level quadrants may encompass a 3×3 or 5×5 group of lower level quadrants.

The length scale or area of the quadrants 305 in Layer 2 may be selected based on the spatial resolution associated with a macrocellular coverage area. For example, the length scale or area of the quadrants 305 may be selected to correspond to the length scale or area of the regions 205 shown in FIG. 2. The quadrants 305 may therefore be used to aggregate session data associated with sessions or user equipment 210 in the regions 205 shown in FIG. 2.

Figure 4:
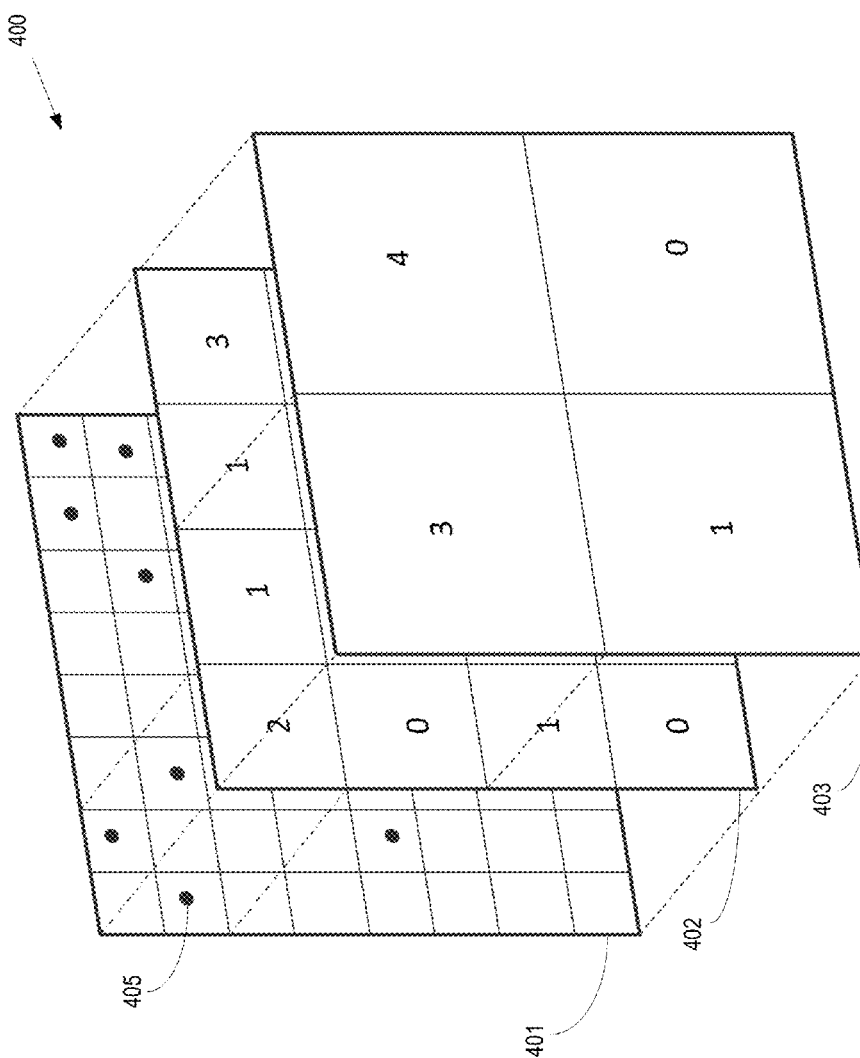
FIG. 4 is a diagram of session data aggregated in quadrants of a set of layers according to some embodiments.

FIG. 4 is a diagram of session data aggregated in quadrants of a set 400 of layers 401, 402, 403, according to some embodiments. The layers 401, 402, 403 may correspond to Layer 2, Layer 1, and Layer 0 shown in FIG. 3. Session data associated with users or sessions in quadrants of the layer 401 is indicated by a black dot 405 (only one indicated by a reference numeral in the interest of clarity) in the corresponding quadrant. For example, a black dot 405 in a quadrant of the layer 401 may indicate that there is a user or an active session in the quadrant. Quadrants in the higher layers 402, 403 aggregate the session data associated with encompass quadrants in the next lower layer. For example, each quadrant in the layer 402 aggregates session data in its four encompassed quadrants of the layer 401 by adding the number of black dots 405 in the encompassed quadrants and storing a number equal to the sum. For another example, each quadrant in the layer 403 aggregate session data in its four encompassed quadrants of the layer 402 by adding the sums of the number of black dots 405 in the encompassed quadrants and storing the resulting value. The aggregated data associated with the quadrants in the layers 401, 402, 403 may then be used to construct a hierarchical data structure.

Figure 5:
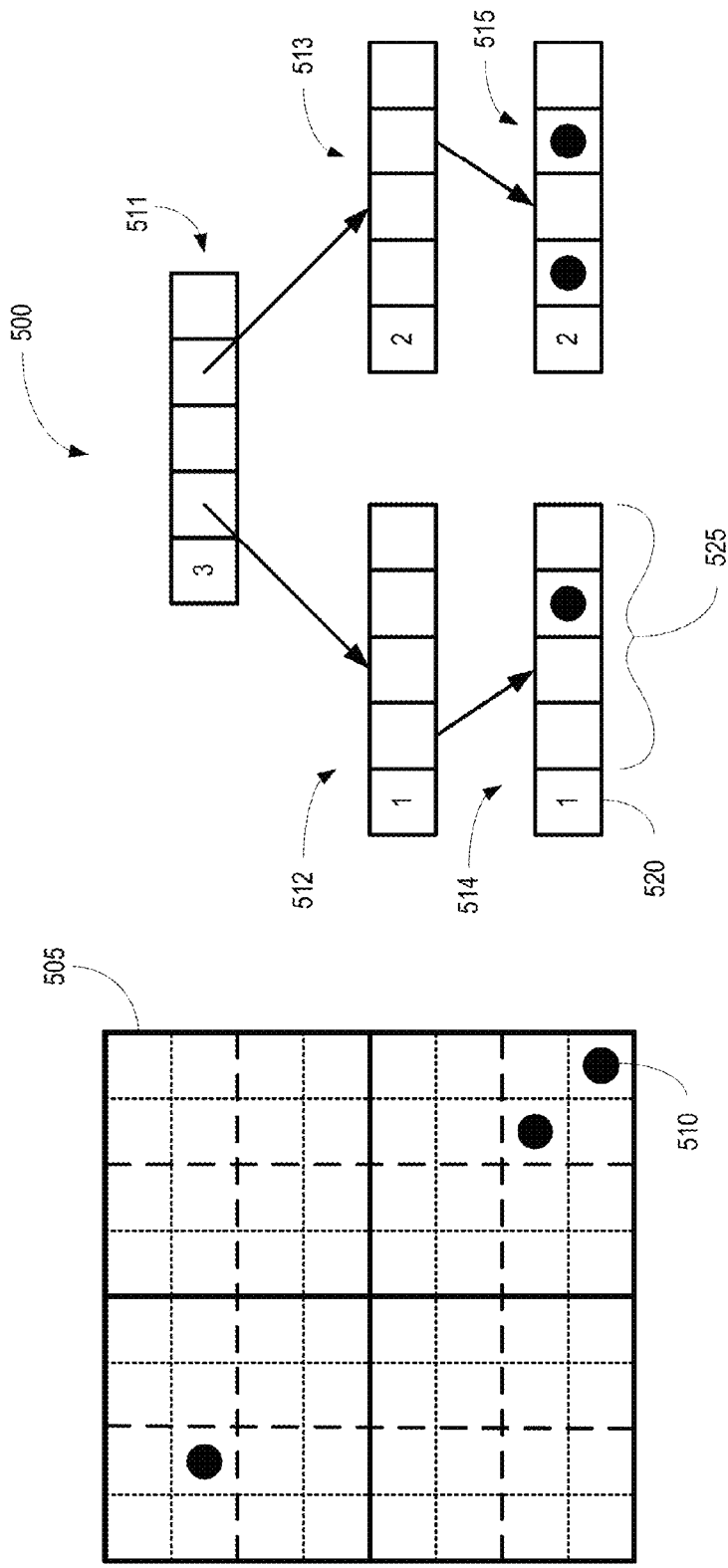
FIG. 5 is a diagram of the hierarchical data structure constructed from a set of layers of quadrants according to some embodiments.

FIG. 5 is a diagram of the hierarchical data structure 500 constructed from a set 505 of layers of quadrants according to some embodiments. The set 505 includes three layers of quadrants and the quadrants in the different layers of the set 505 are indicated by different types of lines. Quadrants in the lowest layer are indicated by the dotted lines, quadrants in the next highest layer indicated by dashed lines, and quadrants in the highest layer indicated by solid lines. Quadrants in the higher layers encompass four quadrants in the next lower layer. Session data is represented by black dots 510 in quadrants of the set 505. For example, each black dot 510 may represent a session in the corresponding quadrant. However, the black dots 510 may represent any type or combination of types of session data.

The hierarchical data structure 500 includes entries 511, 512, 513, 514, 515 (collectively referred to as "the entries 511-515") that each correspond to four quadrants in the different layers of the set that includes session data. Entries are not created for sets of four quadrants in the layers of a set 505 if none of the corresponding four quadrants include session data, e.g., because there are no user equipment in the macrocellular coverage area corresponding to the four quadrants or because the user equipment are inactive. The highest level entry 511 may represent the total macrocellular coverage area and the lower-level entries 512-515 may represent progressively smaller portions of the macrocellular coverage area.

Each entry 511-515 includes a field 520 (only one indicated by a reference numeral in the interest of clarity) that stores information representing the aggregated session data for the four quadrants of the corresponding entry 511-515. The entries 511-515 also includes fields 525 (only one set of fields indicated by a reference numeral in the interest of clarity) that store information associated with the four quadrants associated with the entry 511-515. For example, the aggregated session data field in the entry 511 indicates that the aggregated session data for the corresponding four next lower level quadrants include session data associated with three (3) black dots, which may represent three users, three sessions, or other session data. The first and third session information fields in the entry 511 may include information such as pointers that point to entries 512, 513, which correspond to quadrants that include session data. The entries 512, 513 may also include an aggregated session data field and session information fields that include pointers that point to entries 514, 515.

Entries 514, 515 may be referred to as "leaf nodes" because they are the lowest level entries in the hierarchical data structure 500. In some embodiments, the information stored in the nodes may differ from the information stored in other nodes of the hierarchical data structure 500. For example, the field 520 in the entry 514 indicates that the aggregated session data for the corresponding four lowest level quadrants includes session data associated with one (1) black dot, which may represent a single user or session or other session data. The third field of the fields 525 in the entry 514 includes a black dot to indicate that information associated with the session or user in the corresponding quadrant is stored in the third field of the fields 525. Some embodiments of the information stored in the fields 525 of the entry 514 may include information indicating a location of the user or session. For example, the fields 525 in the entry may include geographical coordinates of the location of the user or session. The location information may be used to address edge quantization errors, as discussed herein.

Some embodiments of the hierarchical data structure 500 also implicitly provide information about high density areas. For example, session data associated with entries 511-515 at a single level can be compared to determine the density of users, sessions, or other session data at a granularity that corresponds to the area of quadrants at the level. This information can be used to prioritize areas with relatively high density by selecting entries 511-515 from a level that best matches the radius of the high density area, which may be a hotspot such as the hotspot 130 shown in FIG. 1.

Figure 6:
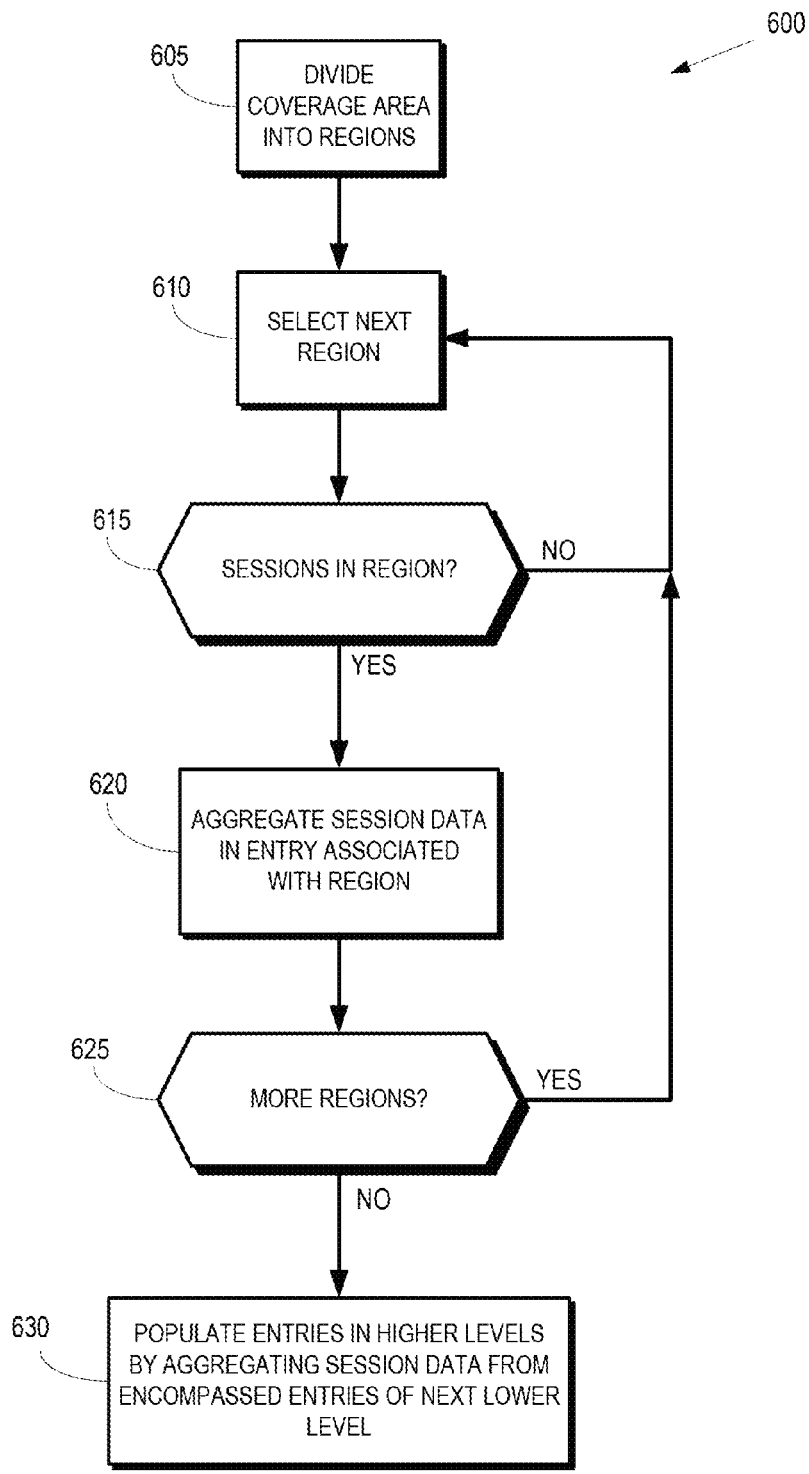
FIG. 6 is a flow diagram of a method for creating a hierarchical data structure according to some embodiments.
Figure 13:
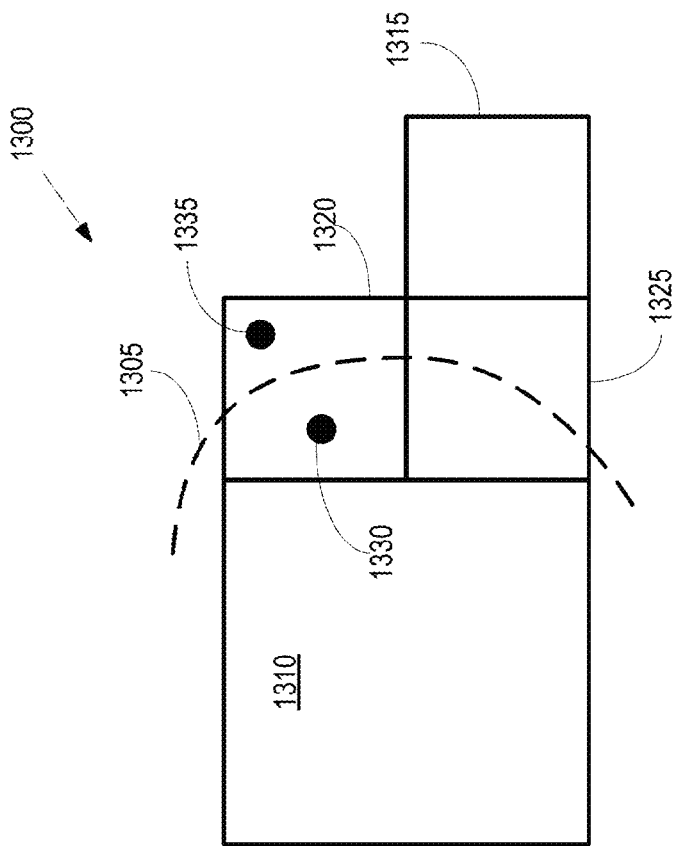
FIG. 13 is a diagram of an edge portion of a partition of a metrocell coverage area into quadrants according to some embodiments.

FIG. 6 is a flow diagram of a method 600 for creating a hierarchical data structure according to some embodiments. The method 600 may be used to create hierarchical data structures for wireless communication systems such as the wireless communication system 100 shown in FIG. 1, e.g., by implementing the method 600 in the controller 135. At block 605, the macrocellular coverage area is divided into regions, such as the regions 205 shown in FIG. 2. At block 610, a region of the macrocellular coverage area is selected. At decision block 615, the method 600 determines whether any sessions are present in the selected region. If not, the method 600 bypasses creation of an entry for this region, flows to block 610, and the next region of the macrocellular coverage area is selected. If the selected region includes one or more sessions, session data associated with the sessions in the region are aggregated and stored in an entry of the hierarchical data structure at block 620. Leaf nodes in the hierarchical data structure represent the smallest region size and may maintain a list of individual sessions in addition to aggregated data so that the location of each individual session can be evaluated as shown in FIG. 13. For example, the session data associated with the region may be stored in a leaf entry such as the entries 514, 515 shown in FIG. 5. At decision block 625, the method 600 may determine whether there are more regions that may include sessions or user equipment. If so, the method 600 flows to block 610 to select the next region.

Once entries have been created to store session data associated with sessions or user equipment in the regions that include sessions or user equipment, entries in higher levels of the hierarchical data structure may be created and populated with aggregated session data from corresponding lower-level entries at block 630. Higher level entries are only created if corresponding lower-level entries have been created to store session data. Otherwise, creation of a higher level entry is bypassed. Some embodiments of the method 600 may create and populate entries in the higher levels of the hierarchical data structure to create a hierarchical data structure such as the hierarchical data structure 500 shown in FIG. 5. The session data stored in the entries of the hierarchical data structure may then be used to evaluate potential hotspots for deployment of metrocells.

Figure 7:
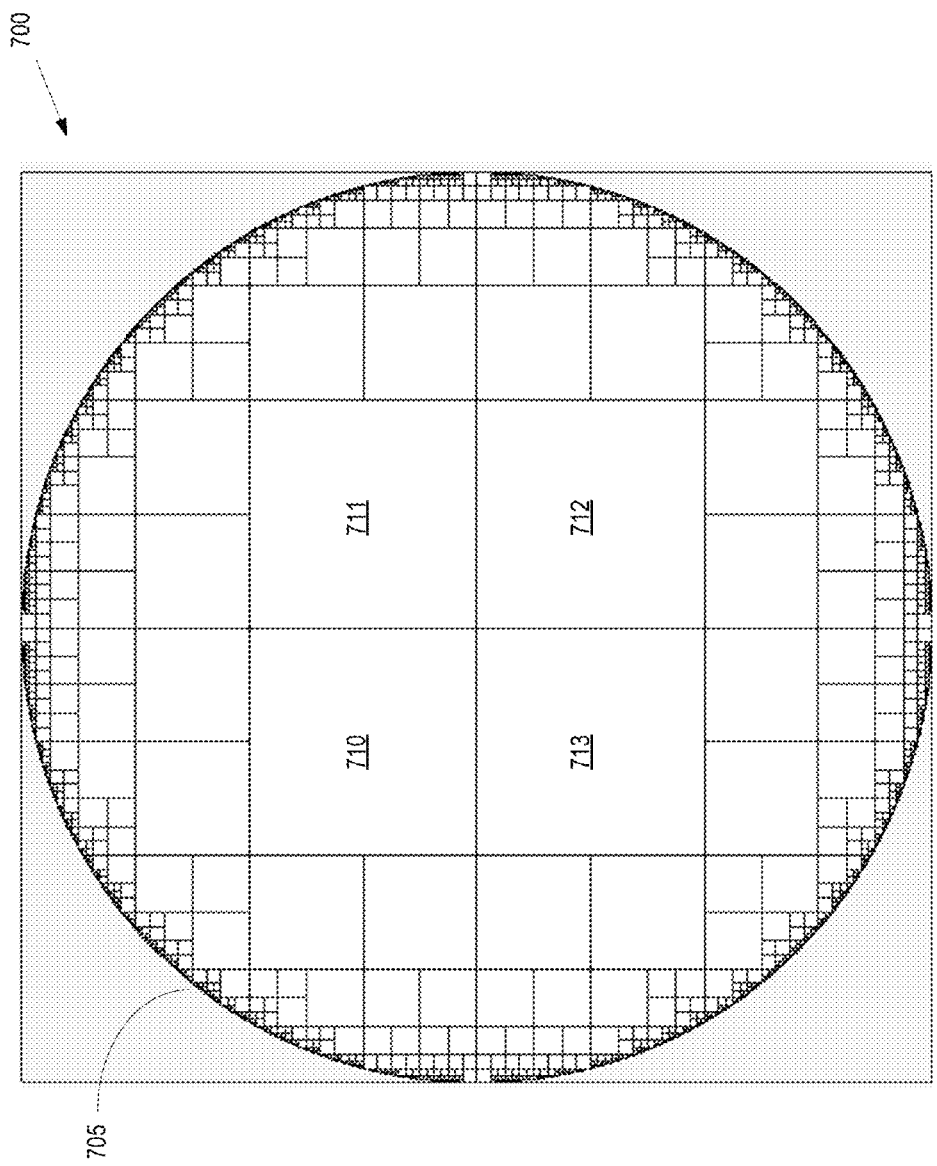
FIG. 7 is a diagram of a partition of a circular area into multi-level quadrants associated with a hierarchical data structure according to some embodiments.

FIG. 7 is a diagram of a partition 700 of a circular area 705 into quadrants associated with a multi-level hierarchical data structure according to some embodiments. The circular area 705 may correspond to a potential hotspot such as the hotspot 130 or a metrocell footprint such as the footprint 120 of the metrocell 115 shown FIG. 1. The lowest level quadrants may correspond to the regions 205 shown in FIG. 2 and higher level quadrants may be defined to encompass predetermined numbers of quadrants in the next lower level, as discussed herein. Four quadrants 710, 711, 712, 713 (referred to collectively as "the quadrants 710-713") are quadrants from the highest level of the multi-level hierarchical data structure. The quadrants 710-713 fit completely within the circular area 705 and may therefore be used to represent an inner portion of the circular area 705. The aggregated session data stored in entries of the multi-level hierarchical data structure corresponding to the quadrants 710-713 may be aggregated and added to the session data associated with the circular area 705. The circular area 705 is represented using seven layers of the multi-level hierarchical data structure. However, the multi-level hierarchical data structure for the entire macrocellular coverage area associated with the potential hotspot may include additional higher levels that are too large to fit completely within the circular area 705 and consequently are not used to represent a portion of the circular area 705.

Additional quadrants from the highest level of the multi-level hierarchical data structure seven FIG. 7 are too large to fit completely within the boundary of the circular area 705 and may intersect the boundary of the circular area 705. Quadrants from the next lower level may therefore be used to represent a part of the remaining area in the circular area 705 if they fit completely within the within the circular area 705. This process is repeated until the lowest level of the multi-level hierarchical data structure is reached. At this point, quadrants from the lowest level that either fit completely within the circular area 705 or intersect with the boundary of the circular area 705 are used to represent the remaining portions of the circular area 705. In the illustrated example, 179 squares in seven different levels are used to describe the circular area 705. Without levels, i.e., if the circular area 705 is represented by a single level of squares having the same dimension as the lowest level of squares in the illustrated example, a total of 1880 squares are needed to represent the circular area 705.

The aggregated session data stored in entries of the hierarchical data structure corresponding to the quadrants used to represent the circular area 705 may be aggregated and added to the session data associated with the circular area 705. The total aggregated session data associated with the circular area 705 may then be used to evaluate the circular area 705 as a potential location for metrocell deployment.

Figure 8:
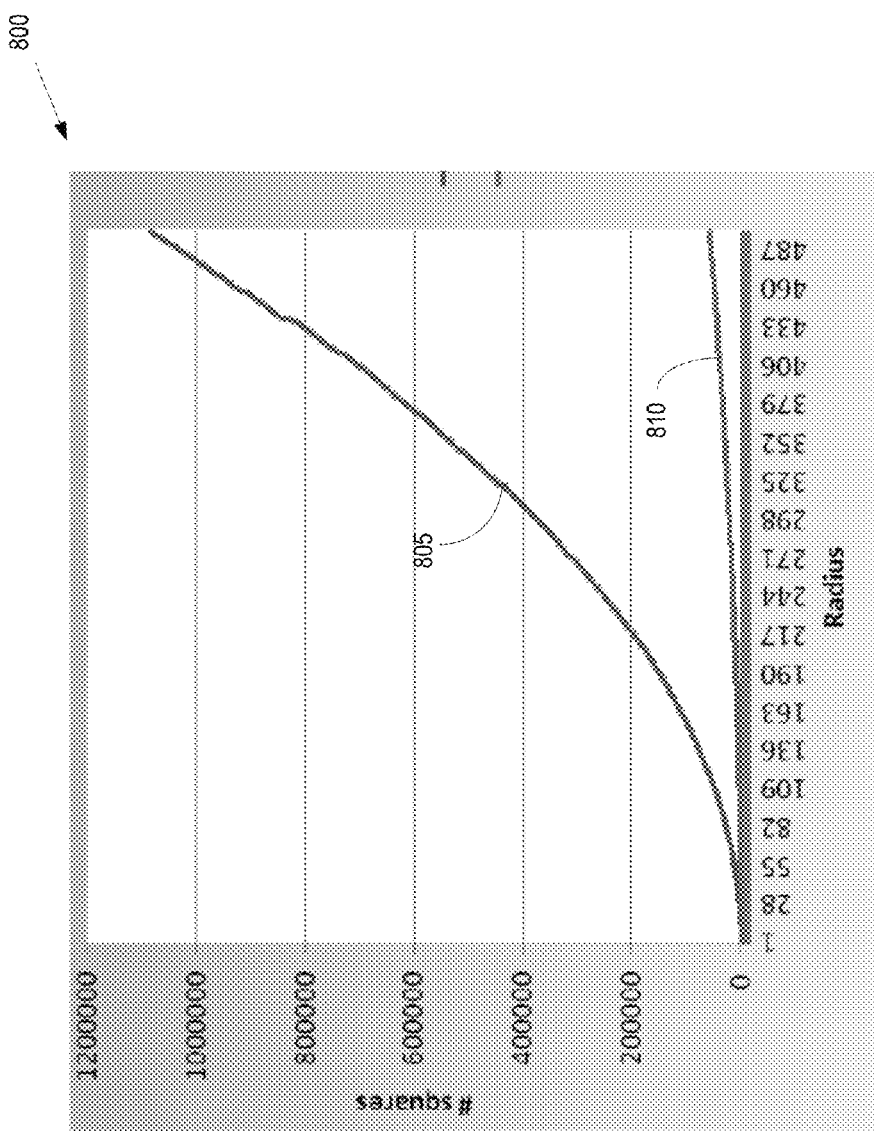
FIG. 8 is a diagram illustrating a difference between a growth rate in the number of quadrants needed to represent a circular area for a single level approach and a multi-level approach according to some embodiments.

FIG. 8 is a diagram 800 illustrating a difference between a growth rate in the number of squares needed to represent a circular area for a single level approach and a multi-level approach according to some embodiments. The vertical axis indicates the number of squares needed to represent the circular area and the horizontal axis indicates the radius of the circular area. The curve 805 illustrates the growth rate in the number of squares when a single level of squares of a predetermined dimension are used to represent the circular area. The curve 810 illustrates the growth rate in the number of squares when multiple levels of squares are used to represent the circular area, as discussed herein. The squares at the lowest of the multiple levels have the same predetermined dimension as the squares in the single level of squares used to generate the curve 805.

Figure 10:
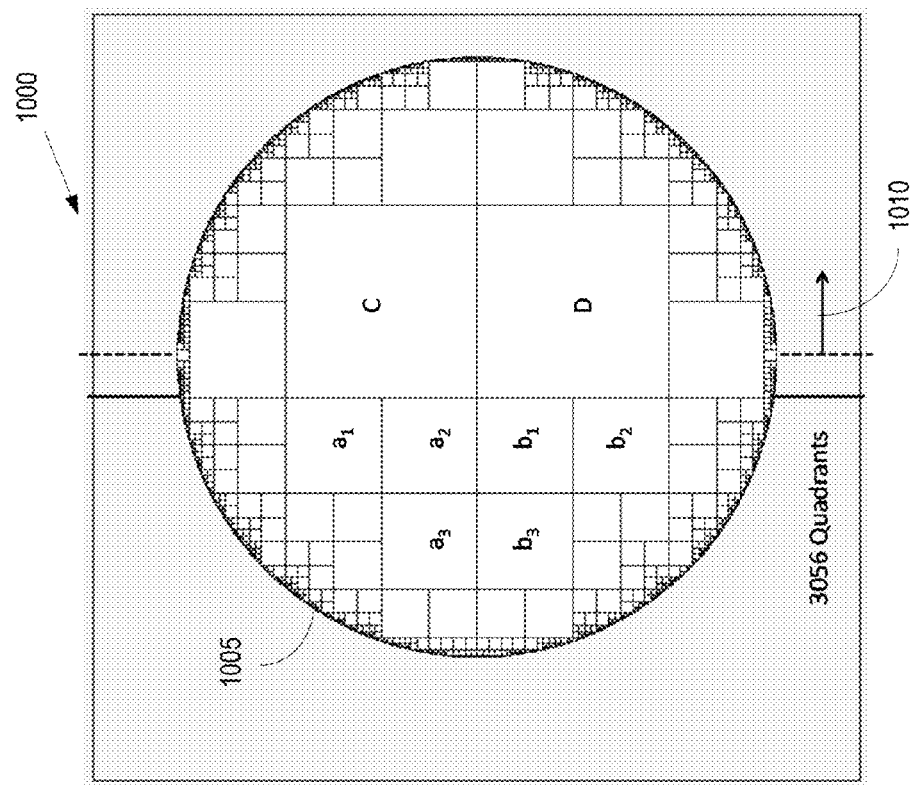
FIG. 10 is a diagram of a second partition of a circular metrocell area into quadrants of the multi-level hierarchical data structure according to some embodiments.
Figure 9:
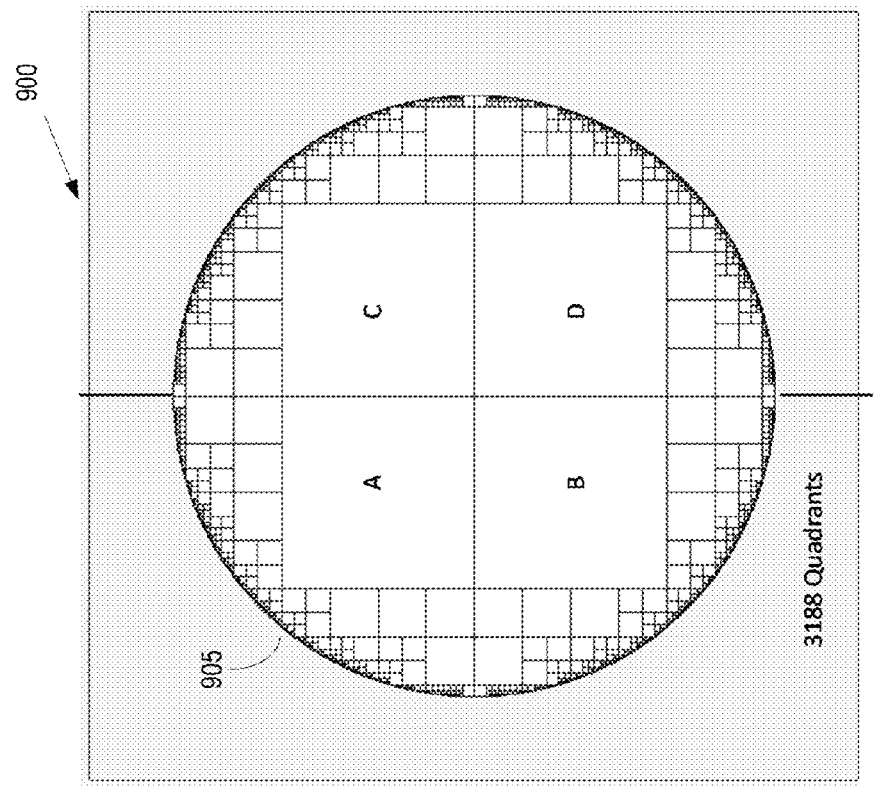
FIG. 9 is a diagram of a first partition of a circular metrocell area into quadrants of a multi-level hierarchical data structure according to some embodiments.

FIG. 9 is a diagram of a first partition 900 of a circular area 905 into quadrants of a multi-level hierarchical data structure according to some embodiments. FIG. 10 is a diagram of a second partition 1000 of a circular area 1005 into quadrants of the multi-level hierarchical data structure according to some embodiments. The radii of the circular areas 905, 1005 are the same but the circular areas 905, 1005 are positioned at different offsets relative to the underlying quadrant structure. For example, the circular areas 905, 1005 may overlay the partition 200 shown in FIG. 2, but they may be at slightly different locations to create the offset. The relative offset is indicated by the arrow 1010. Quadrants C and D are identical in the partitions 900, 1000, and their aggregated values can be used to determine the total aggregated session data for the circular areas 905, 1005. However, due to the offset 1010, the quadrants A and B completely fit within the boundary of the circular area 905, but they intersect with the boundary of the circular area 1005. Consequently, quadrants of the next lower levels of the highest level quadrants A and B are used to represent this portion of the circular area 1005. This placement of the circular areas 905, 1005 relative to each other results in the circular area 905 being represented by 3188 quadrants and the circular area 1005 being represented by 3056 quadrants.

Figure 11:
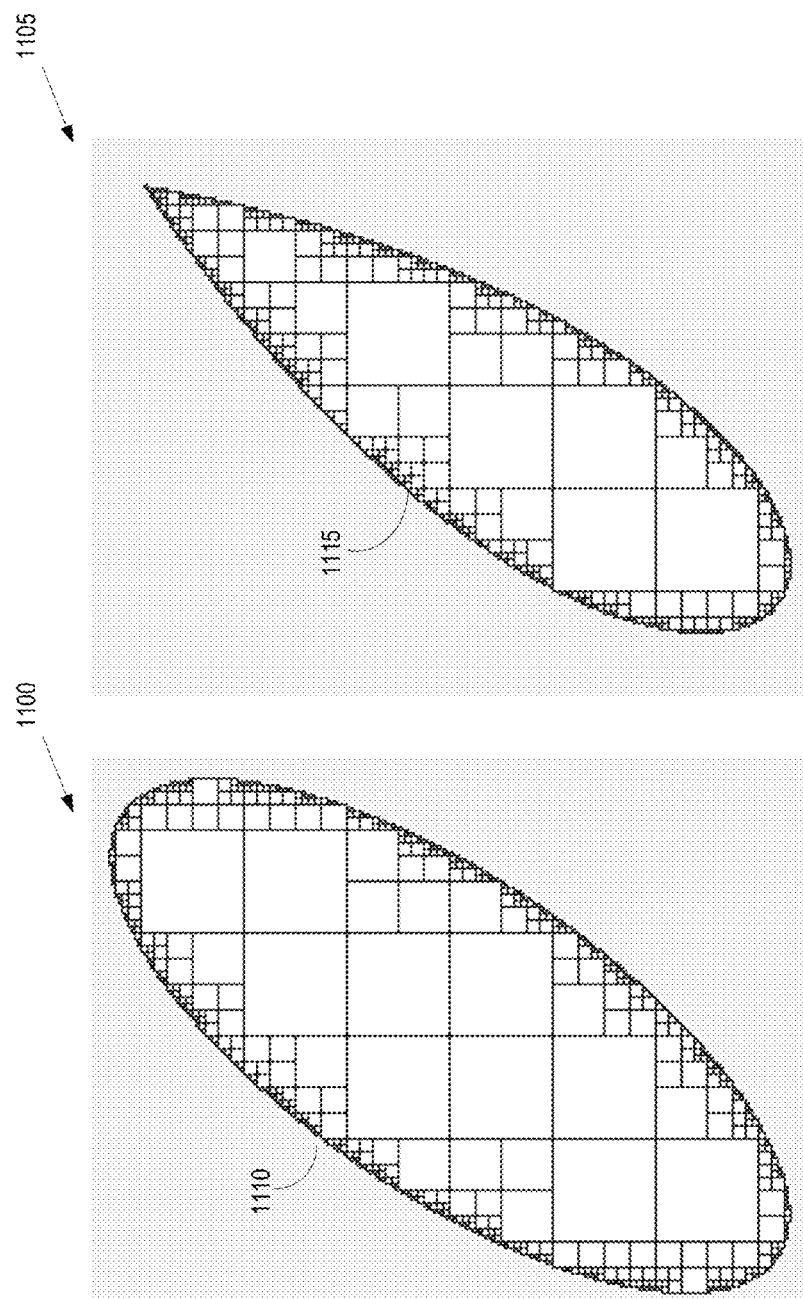
FIG. 11 is a diagram of partitions of non-circular areas into quadrants of a multi-level hierarchical data structure according to some embodiments.

FIG. 11 is a diagram of partitions 1100, 1105 of non-circular areas 1110, 1115 into quadrants of a multi-level hierarchical data structure according to some embodiments. Some embodiments of metrocells may implement antennas, antenna arrays, or beamforming functionality that generate non-circular antenna lobes. Embodiments of the non-circular areas 1110, 1115 may be used to represent directional antenna patterns, which can be approximated by an elliptical shape or an asymmetrical elliptical shape. The non-circular areas 1110, 1115 can then be represented by quadrants of the multi-level hierarchical data structure and session data associated with the quadrants can be aggregated to evaluate the total session data associated with the non-circular areas 1110, 1115.

Figure 12:
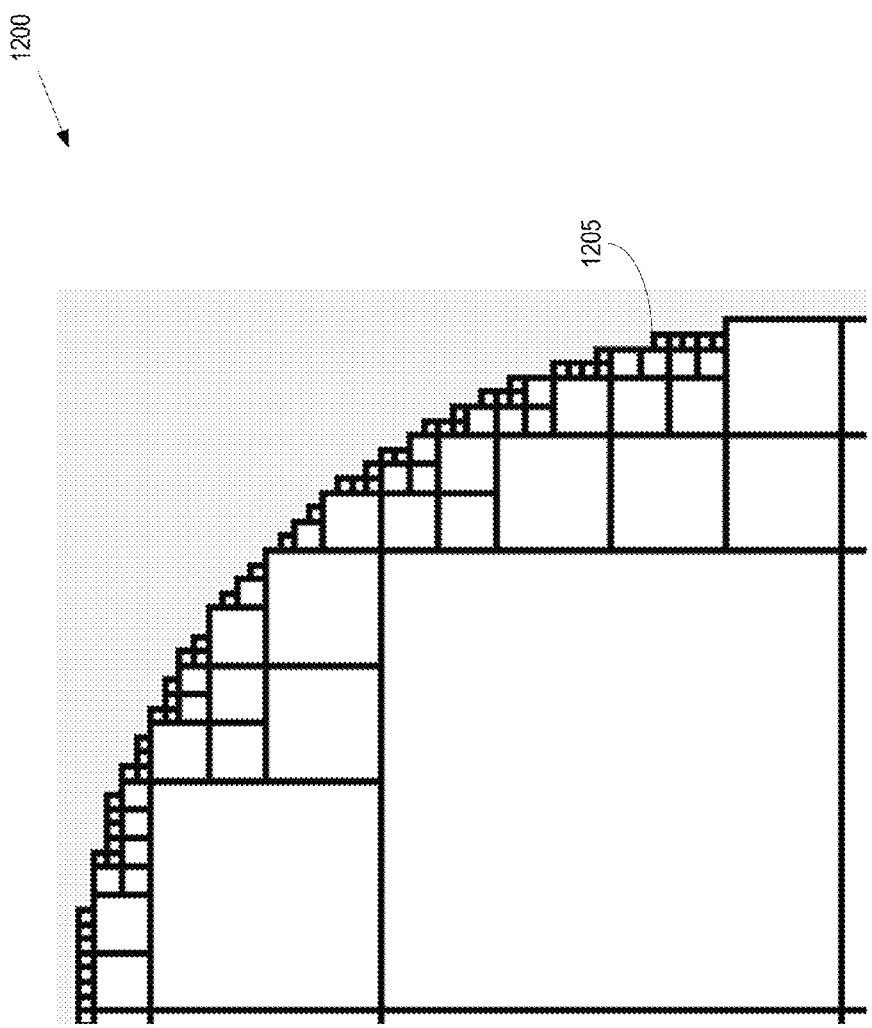
FIG. 12 is a diagram of a portion of a partition of a circular metrocell area into quadrants according to some embodiments.

FIG. 12 is a diagram of a portion 1200 of a partition of a circular area into quadrants according to some embodiments. The portion 1200 illustrates that the smallest quadrants 1205 (only one indicated by a reference numeral in the interest of clarity) at the edge of the circular area do not precisely trace a smooth boundary of the circular area. Instead, the edge of the portion 1200 is ragged and the finite size of the smallest quadrants 1205 results in edge quantization. In some embodiments, edge quantization errors can be resolved by storing information in the leaf nodes of the hierarchical data structure that indicates the exact location of each user or session within a metrocell coverage area corresponding to the edge quadrants 1205. The location of each user or session may then be compared to the location of the boundary of the circular area to determine whether the user or session is within the boundary. Session data associated with users or sessions that are within the boundaries may then be aggregated and stored in the leaf nodes associated with the edge quadrants 1205, as discussed herein.

FIG. 13 is a diagram of an edge portion 1300 of a partition of a metrocell coverage area into quadrants according to some embodiments. The metrocell coverage area has a boundary 1305 that completely encompasses at least one higher level quadrant 1310. The quadrant 1310 may therefore be used to represent the metrocell coverage area and session data associated with the quadrant 1310 may be aggregated into the total. The low-level quadrant 1315 is completely outside of the boundary 1305 and is therefore not used to represent the metrocell coverage area. The low-level quadrants 1320, 1325 intersect the boundary 1305 and may be used to represent a metrocell coverage area because these are the lowest level quadrants available. However, only session data associated with sessions within the boundary 1305 may be aggregated into the total. For example, location information indicates that the session 1330 is located within the boundary 1305 and the session data associated with the session 1330 may therefore be aggregated into the total. Location information indicates that the session 1335 is located outside of the boundary 1305 and session data associated with the session 1335 may therefore not be aggregated into the total.

FIG. 14 is a fragment of pseudocode that illustrates an algorithm 1400 for aggregating data associated with a potential hotspot in a macrocellular coverage area using the minimum number of quadrants required in different levels of the hierarchical data structure per metrocell coverage area according to some embodiments. The algorithm 1400 may operate on a previously defined hierarchical data structure such as the hierarchical data structure 400 shown in FIG. 4 or the hierarchical data structure 500 shown in FIG. 5. The algorithm 1400 may be used to find the minimum number of partitions of a metrocell coverage area such as the partition 700 shown in FIG. 7, the partition 900 shown in FIG. 9, the partition 1000 shown in FIG. 10, or the partitions 1100, 1105 shown in FIG. 11. In the illustrated embodiment, the algorithm 1400 recursively traverses the hierarchical data structure from its highest level entry and examines each entry that is within the potential hotspot or intersects with a boundary of the potential hotspot. When the algorithm 1400 is invoked on the highest level entry, the returned value is the total aggregated value of the session data for all sessions or users within the metrocell coverage area.

The area parameter defined by the pseudocode supports at least three methods. First, the area parameter supports a containment test to determine if a particular point is within the area. Second, the area parameter supports a rectangular exclusion test to determine if a given rectangle is completely outside the service area. Third, the area parameter supports a rectangular containment test to test if a rectangle is completely contained within the service area. Session data may contain any number of fields that may correspond to different types of session data. For example, the session data may include fields for storing information such as a number of sessions, a number of downlink bytes, a number of uplink bytes, a number of unique user equipment, a number of concurrent users within a time interval, and a measure of signal strength. The aggregate object serves as an aggregator for session data associated with an entry in the hierarchical data structure. The aggregate object supports an add operation or a combine operation to add or combine session data from other entries.

At each level in the recursion, the algorithm 1400 evaluates quadrants at the current level of the hierarchical data structure. If a quadrant is completely outside the potential hotspot (no intersection) the aggregate object returns a null value and if the quadrant is completely contained within the potential hotspot, the aggregate object returns the total aggregated value of the session data for the quadrant. If neither condition is true, the quadrant intersects with the boundary of the potential hotspot so that a portion of the quadrant is within the potential hotspot and another portion of the quadrant is outside the potential hotspot. The aggregate object then recursively evaluates the quadrants in the next lower level that are encompassed by the current quadrant. The recursion proceeds until the aggregate object reaches the lowest level in the hierarchical data structure and evaluates the leaf nodes. Quadrants without any data points result in null references in the hierarchical data structure and are skipped, which can significantly reduce the number of entries in the hierarchical data structure that are processed, particularly if the macrocellular coverage area is sparsely populated.

Some embodiments of the algorithm 1400 may be used to identify deployment locations for metrocells such as the metrocell 115 shown in FIG. 1. For example, the algorithm 1400 may be applied to potential hotspots distributed throughout the macrocellular coverage area. The locations of the potential hotspots may be distributed uniformly, in which case the total computation time may increase quadratically with the radius of the macrocellular coverage area. The locations of the potential hotspots may also be placed at distance intervals that are large relative to a minimum spatial resolution, which may reduce the overall computation time. Some embodiments may prioritize locations that are associated with higher densities of users or sessions, which may be indicated by session data in the hierarchical data structure. Higher priority locations corresponding to higher densities of users or sessions may therefore be evaluated as potential locations for metrocells before lower priority locations that correspond to lower densities of users or sessions.

Overlap between the footprints of metrocells used to provide coverage in hotspots of the macrocellular coverage area may lead to radio interference between the metrocells. In one embodiment, the potential hotspots may therefore be ordered or ranked based on the aggregated session data associated with the potential hotspots. The best locations for metrocell deployment may be selected from the highest ranked potential hotspots. Hotspots that overlap with the selected locations for metrocell deployment may be removed from the list and this process may be iterated until a threshold number of hotspots has been identified or the list is exhausted. In one embodiment, the highest ranked potential hotspot may be selected for deployment of a metrocell. Quadrants associated with the highest ranked potential hotspot may then be removed from the aggregated session data in the hierarchical data structure. The evaluation process may then be repeated to select the next highest ranked potential hotspot for deployment of another metrocell.

Figure 15:
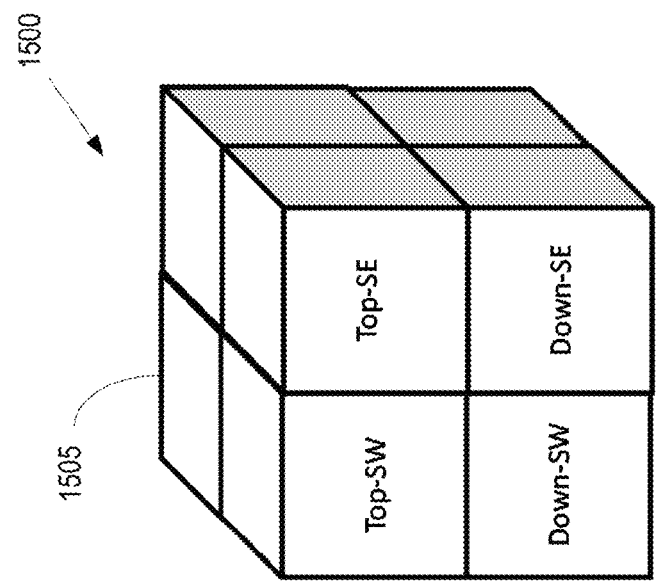
FIG. 15 is a block diagram of a set of cubes that can be used to represent a three-dimensional macrocellular coverage area according to some embodiments.

FIG. 15 is a block diagram of a set 1500 of cubes 1505 that can be used to represent a three-dimensional macrocellular coverage area according to some embodiments. The three-dimensional macrocellular coverage area may also be referred to as a macrocellular coverage volume. The set 1500 illustrates two levels in a three-dimensional hierarchy. For example, the individual cubes 1505 may represent the lowest level of the three-dimensional hierarchy and a cube that encompasses eight of the individual cubes 1505 may represent the next higher level of the three-dimensional hierarchy. Session data for users or sessions within the cubes 1505 may be aggregated and used to create a hierarchical data structure to store aggregated session data at different levels, as discussed herein. The cubes 1505 may also be used to represent a three-dimensional macrocellular coverage area such as the interior of an office building. The three-dimensional representations of hotspot volumes at different locations may then be used to evaluate potential hotspot locations for deployment of a metrocell such as the metrocell 115 shown in FIG. 1. The number of levels in the three-dimensional hierarchy may be determined based on a total volume of a three-dimensional macrocellular coverage area and a volumetric resolution of the lowest level cubes 1505.

Some embodiments of the algorithm 1400 shown in FIG. 14 can be used to aggregate session data for users or sessions within a three-dimensional macrocellular coverage area. Embodiments of the three-dimensional version of the algorithm 1400 may support three operations analogous to the two-dimensional operations described above. First, the algorithm 1400 may implement a containment test to determine if a particular three-dimensional point is within a volume. Second, the algorithm 1400 may implement a cubic exclusion test to determine if a given cube is completely outside the volume. Third, the algorithm 1400 may implement a cubic containment test to test if a cube is completely contained within the volume. The algorithm 1400 can then recursively evaluate cubes at different levels in the three-dimensional hierarchical data structure, as discussed herein.

Entries in the two-dimensional or three-dimensional hierarchical data structures described herein can be accessed concurrently by the read-only operations performed in the algorithm 1400. Thus, some embodiments of the algorithm 1400 may be performed in parallel on multiple processing units, such as multiple processing units implemented in the controller 135 shown in FIG. 1. For example, multiple threads may be implemented on the multiple processing units and each thread can evaluate potential hotspots in a different portion of the macrocellular coverage area. Once the threads have completed, list of potential hotspots generated by the different threads can be merged and used to select some or all of the potential hotspots for deployment of a metrocell. Experiments have shown that parallel computation may reduce the overall computation time by 25% in some cases.

Figure 16:
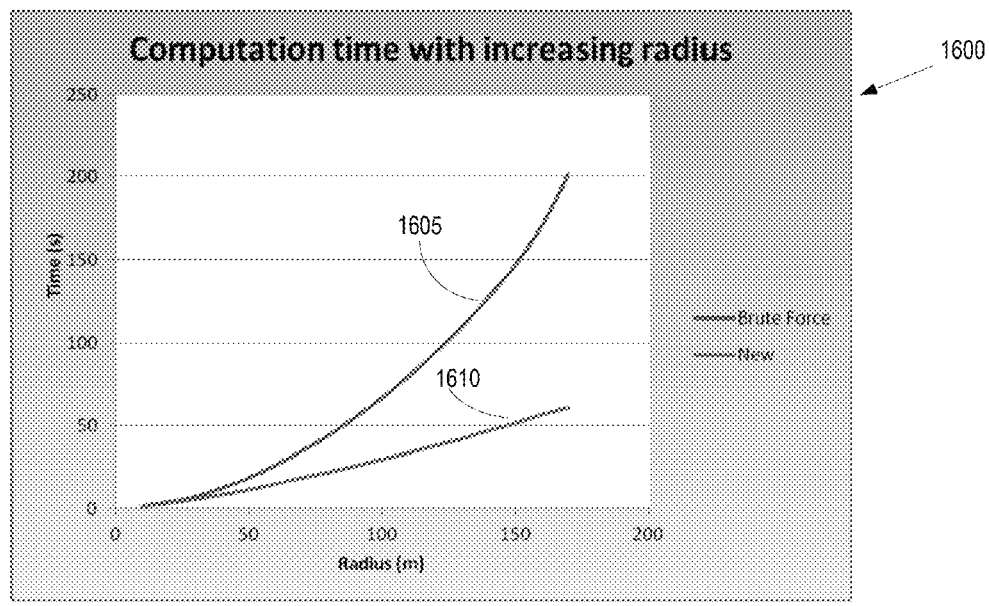
FIG. 16 is a plot comparing the computation time as a function of hotspot radius for a single level approach and a multi-level approach according to some embodiments.

FIG. 16 is a plot 1600 comparing the computation time as a function of hotspot radius for a single level approach and a multi-level approach according to some embodiments. The plot 1600 is generated assuming that the potential hotspots are evaluated in a macrocellular area that is uniformly populated with users or sessions. The area size is 512×512 units with a 1 unit minimum resolution. The vertical axis indicates the computation time required to evaluate the potential hotspots and the horizontal axis indicates the radius of the potential hotspots. The curve 1605 shows an approximately quadratic growth rate of the computation time for the single level approach and the curve 1510 shows an approximately linear growth rate of the computation time for the multi-level approach described herein.

Figure 17:
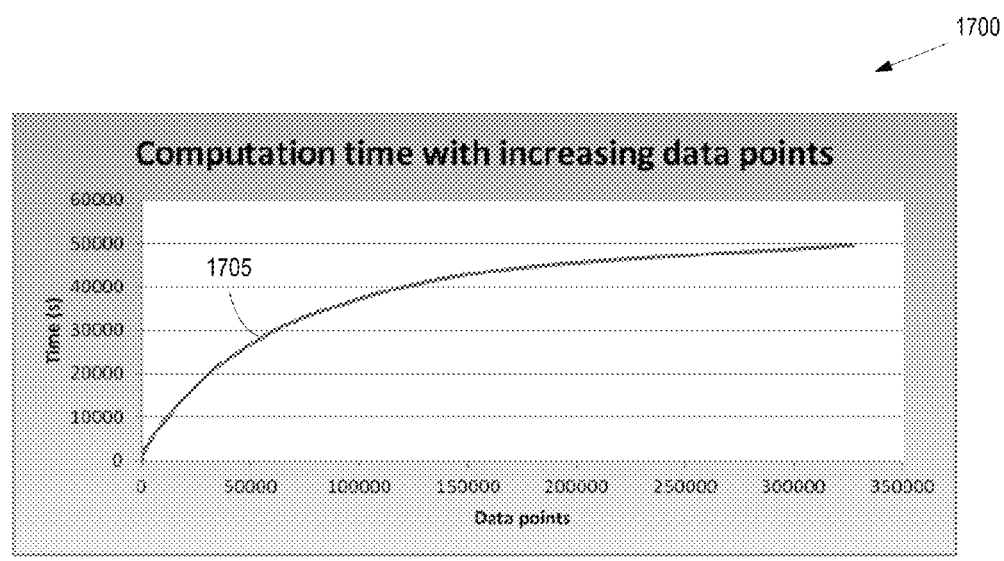
FIG. 17 is a plot illustrating the computation time as a function of a number of data points for a multi-level approach according to some embodiments.

FIG. 17 is a plot 1700 illustrating the computation time as a function of a number of data points for a multi-level approach according to some embodiments. Each data point corresponds to a user or session in the macrocellular coverage area. The plot 1700 is generated assuming that the potential hotspots are evaluated in a macrocellular area that is uniformly populated with users or sessions. The area size is 512×512 units with a 1 unit minimum resolution. The vertical axis indicates the computation time required to evaluate the potential hotspots and the horizontal axis indicates the number of data points (e.g., users or sessions) within the macrocellular coverage area. The curve 1705 shows that the computation time asymptotically reaches a maximum as the macrocellular coverage area becomes saturated with data points. However, the computation time is significantly lower when the data point density is low, as indicated at the left side of the lot 1700.

Figure 18:
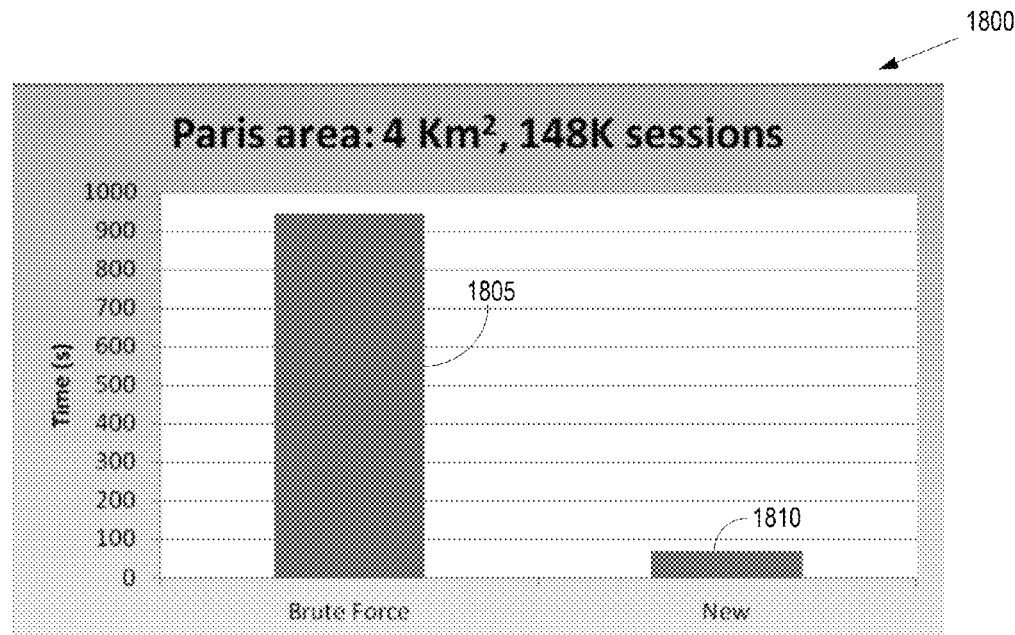
FIG. 18 is a plot comparing the computation time for a single level approach and a multi-level approach applied to field data from Paris, France according to some embodiments.

FIG. 18 is a plot 1800 comparing the computation time for a single level approach and a multi-level approach applied to field data from Paris, France according to some embodiments. The field of data consists of 148,331 sessions at 1 meter (m) resolution spread over an area of size 2×2 km. The radius size for potential hotspots is fixed at 100 m and a maximum scanning resolution of 1 m was used to evaluate the different potential hotspots. Consequently, 4 million hotspot positions were evaluated to produce the plot 1800. The bar 1805 shows that the single level approach required 944 seconds to evaluate the potential hotspot locations. The bar 1810 shows that the multi-level approach described herein required 70 seconds to evaluate the potential hotspot locations.

Figure 19:
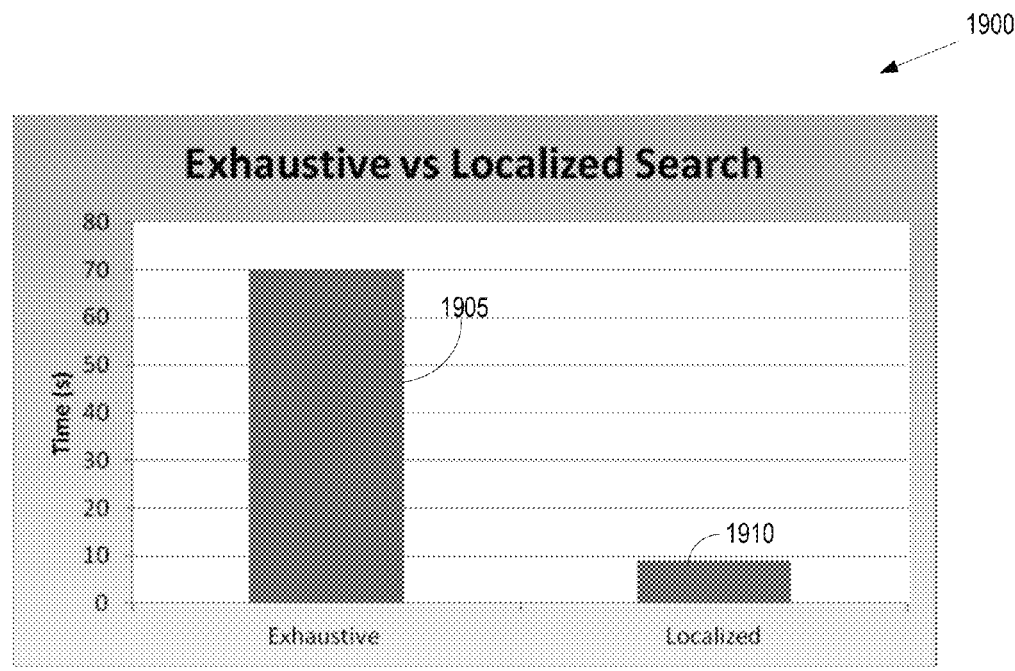
FIG. 19 is a plot comparing the computation time for an exhaustive search of a potential hotspot locations and a localized search in high density areas using a multi-level approach applied to field data from Paris, France according to some embodiments.

FIG. 19 is a plot 1900 comparing the computation time for an exhaustive search of a potential hotspot locations and a localized search in high density areas using a multi-level approach applied to field data from Paris, France according to some embodiments. The Paris dataset used in FIG. 18 is also used to produce the plot in FIG. 19 and the hotspot radius is fixed at 100 m. High density areas are identified using a broad search on a hierarchical data structure produced for the dataset on a level corresponding with 128×128 m. Quadrants in this level are grouped in overlapping clusters to form 256×256 quadrants that are approximately the diameter size of the potential hotspots. A sliding window search method is then used to locate three areas of approximately 256×256 m that have the highest density of data points. The localized search and the exhaustive search produced the same hotspots. However, the bar 1905 shows that the exhaustive search required significantly more computation time than the localized search, indicated by the bar 1910.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
    accessing, by a processing unit in a controller, session data for a plurality of sessions associated with user equipment in portions of a macrocellular coverage area; and
    generating, by the processing unit, a hierarchical data structure comprising a plurality of levels, wherein each entry in a higher level of the plurality of levels encompasses a predetermined number of entries in a next lower level and stores aggregated session data for sessions associated with the encompassed entries,
    wherein accessing the session data for the plurality of sessions comprises accessing the session data for a plurality of cubes that have a predetermined volume of the macrocellular coverage area.

2. The method of claim 1, wherein generating the hierarchical data structure comprises bypassing generation of an entry if there are no sessions in a portion of the macrocellular coverage area associated with the entry.

3. The method of claim 2, wherein generating the hierarchical data structure comprises configuring a pointer in each entry in a higher level of the hierarchical data structure to indicate at least one entry in the next lower level that stores aggregated session data.

4. The method of claim 1, wherein accessing the session data for the sessions comprises accessing the session data for a plurality of quadrants that are associated with a predetermined area of the macrocellular coverage area.

5. The method of claim 4, wherein generating the hierarchical data structure comprises generating the plurality of levels such that each entry in one of the plurality of levels encompasses four entries in the next lower level.

6. The method of claim 1, wherein generating the hierarchical data structure comprises generating the plurality of levels such that each entry in one of the three or more levels encompasses eight entries in the next lower level.

7. The method of claim 1, wherein accessing the session data for the plurality of sessions comprises accessing at least one of a number of sessions, a number of downlink bytes, a number of uplink bytes, a number of unique user equipment, a number of concurrent users within a time interval, or a measure of signal strength.

8. A method, comprising:
selecting, by a processing unit in a controller, entries in a hierarchical data structure to represent a hotspot that overlays a macrocellular coverage area,
wherein the hierarchical data structure comprises three or more levels, and
wherein each entry in a higher level of the three or more levels encompasses a predetermined number of entries in a next lower level and
stores aggregated session data for sessions associated with the encompassed entries, and
wherein selecting the entries in the hierarchical data structure comprises recursively traversing the hierarchical data structure to select entries in the in the three or more levels of the hierarchical data structure that correspond to portions of the macro cellular coverage area that are completely contained within a boundary of the hotspot; and
aggregating, by a processing unit, session data stored in the selected entries.

9. The method of claim 8, wherein selecting the entries in the hierarchical data structure to represent the hotspot comprises selecting a minimum number of entries in the hierarchical data structure to represent a surface area or volume of the hotspot that overlays the macrocellular coverage area.

10. The method of claim 8, wherein selecting the entries in the hierarchical data structure comprises selecting entries in a lowest level of the hierarchical data.

11. The method of claim 10, wherein selecting the entries in the hierarchical data structure comprises bypassing selection of entries that correspond to portions of the macrocellular coverage area that are completely outside the boundary of the hotspot.

12. The method of claim 8, wherein the hotspot is one of a plurality of potential hotspots, and further comprising:
selecting entries in the hierarchical data structure to represent each of the plurality of potential hotspots;
aggregating the session data for each of the plurality of potential hotspots; and
selecting one of the plurality of potential hotspots for deployment of a metrocell by comparing the aggregated session data for each of the plurality of potential hotspots.

13. The method of claim 12, further comprising:
selecting locations for the plurality of potential hotspots based on aggregated session data in entries of one of the three or more levels, wherein a length scale of a portion of the macrocellular coverage area associated with entries in the one of the three or more levels corresponds to a length scale associated with the plurality of potential hotspots.

14. The method of claim 12, further comprising:
removing potential hotspots from a priority list of potential hotspots ordered based on the aggregated session data, when the potential hotspots overlap with hotspots that have higher priorities in the priority list.

15. The method of claim 8, wherein selecting the entries in the hierarchical data structure to represent the hotspot that overlays the macrocellular coverage area comprises selecting entries to represent at least one of a two-dimensional hotspot and a three-dimensional hotspot that overlays the macrocellular coverage area.

16. The method of claim 8, wherein aggregating the session data comprises aggregating at least one of a number of sessions, a number of downlink bytes, a number of uplink bytes, a number of unique user equipment, a number of concurrent users within a time interval, and a measure of signal strength.

17. The method of claim 8, wherein selecting the entries in the hierarchical data structure comprises concurrently evaluating a plurality of entries in the hierarchical data structure for selection using a plurality of processing units.

18. A method, comprising:
selecting, by a processing unit in a controller,
entries in a hierarchical data structure to represent a hotspot that overlays a macrocellular coverage area,
wherein the hierarchical data structure comprises a plurality of levels,
wherein each entry in a higher level of the plurality of levels encompasses a predetermined number of entries in the next lower level and
stores aggregated session data for sessions associated with the encompassed entries, and wherein the hotspot is one of a plurality of potential hotspots;
aggregating, by the processing unit, session data stored in the selected entries;
selecting, by the processing unit, entries in the hierarchical data structure to represent each of the plurality of potential hotspots;
aggregating, by the processing unit, the session data for each of the plurality of potential hotspots; and
selecting, by the processing unit, one of the plurality of potential hotspots for deployment of a metrocell by comparing the aggregated session data for each of the plurality of potential hotspots; and
removing, by the processing unit, entries associated with the selected one of the plurality of potential hotspots and updating the aggregated session data for each of the unselected potential hotspots prior to selecting another one of the plurality of potential hotspots for deployment of another metrocell.

* * * * *

UNITED STATES PATENT AND TRADEMARK OFFICE
CERTIFICATE OF CORRECTION

PATENT NO. : 9,526,012 B2  
APPLICATION NO. : 14/323498  
DATED : December 20, 2016  
INVENTOR(S) : Harm Jan Batteram et al.

Page 1 of 1

It is certified that error appears in the above-identified patent and that said Letters Patent is hereby corrected as shown below:

In the Claims

Column 15, Claim 6, Line 13, please delete "three or more levels" and substitute -plurality of levels-.

Column 15, Claim 8, Line 34, please delete "in the in the" and substitute -in the-.

Column 15, Claim 8, Line 36, please delete "macro cellular" and substitute -macrocellular-.

Column 15, Claim 10, Line 48, please delete "hierarchical data" and substitute -hierarchical data structure that corresponds to portions of the macrocellular coverage area that intersects with the boundary of the hostpot.-.

Signed and Sealed this  
Thirtieth Day of July, 2019

Andrei Iancu  
*Director of the United States Patent and Trademark Office*